(12) United States Patent
Mozano

(10) Patent No.: US 11,646,884 B2
(45) Date of Patent: May 9, 2023

(54) DATABASE KEY MANAGEMENT

(71) Applicant: ServiceNow, Inc., Santa Clara, CA (US)

(72) Inventor: Ashton Mozano, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 56 days.

(21) Appl. No.: 17/339,509

(22) Filed: Jun. 4, 2021

(65) Prior Publication Data

US 2022/0393868 A1   Dec. 8, 2022

(51) Int. Cl.
*H04L 9/08* (2006.01)
*G06F 21/60* (2013.01)
*H04L 9/40* (2022.01)

(52) U.S. Cl.
CPC .......... *H04L 9/0891* (2013.01); *G06F 21/602* (2013.01); *H04L 9/083* (2013.01); *H04L 9/0861* (2013.01); *H04L 63/166* (2013.01)

(58) Field of Classification Search
CPC ............................ H04L 63/166; H04L 9/0891
See application file for complete search history.

(56) References Cited

U.S. PATENT DOCUMENTS

| | | | | |
|---|---|---|---|---|
| 9,942,211 | B1* | 4/2018 | Campagna | H04L 9/0822 |
| 2004/0218762 | A1* | 11/2004 | Le Saint | H04L 9/0825 |
| | | | | 380/277 |
| 2011/0225423 | A1* | 9/2011 | Lynch | H04L 9/0827 |
| | | | | 713/171 |
| 2012/0204032 | A1* | 8/2012 | Wilkins | H04L 63/0428 |
| | | | | 713/170 |
| 2016/0065370 | A1* | 3/2016 | Le Saint | H04L 9/14 |
| | | | | 713/155 |
| 2017/0012870 | A1* | 1/2017 | Blair | H04L 45/64 |
| 2017/0163607 | A1* | 6/2017 | Skuratovich | H04L 65/1046 |
| 2017/0214671 | A1* | 7/2017 | Lehr | H04L 63/0435 |
| 2017/0331802 | A1* | 11/2017 | Keshava | H04L 9/0894 |

* cited by examiner

*Primary Examiner* — William S Powers
(74) *Attorney, Agent, or Firm* — Van Pelt, Yi & James LLP

(57) ABSTRACT

An indication that a secure connection has been established with a key management service is received. The secure connection is associated with an automatically generated session encryption key utilized for encryption of data communication through the secure connection. In response to the indication that the secure connection has been established with the key management service, a determination is made to perform a rotation of a local encryption key utilized in encrypting locally stored data. The rotation of the local encryption key is performed based at least in part on the automatically generated session encryption key.

20 Claims, 6 Drawing Sheets

DATABASE KEY MANAGEMENT

BACKGROUND OF THE INVENTION

Cloud-based solutions allow businesses to rapidly build and deploy software applications. These applications are often offered as software services and typically require a persistence layer in order to maintain state. Cloud-based solutions often utilize one or more database systems to implement the required persistence layer. These database systems can be utilized to store information such as customer data. Since the stored data can contain highly sensitive information and may be confidential, the data stored on cloud-base systems is often encrypted. For example, database systems may utilize master encryption keys as well as tablespace encryption keys for encrypting database data. In some embodiments, a key management server is utilized to manage the different encryption keys.

BRIEF DESCRIPTION OF THE DRAWINGS

Various embodiments of the invention are disclosed in the following detailed description and the accompanying drawings.

DETAILED DESCRIPTION

Figure 1:
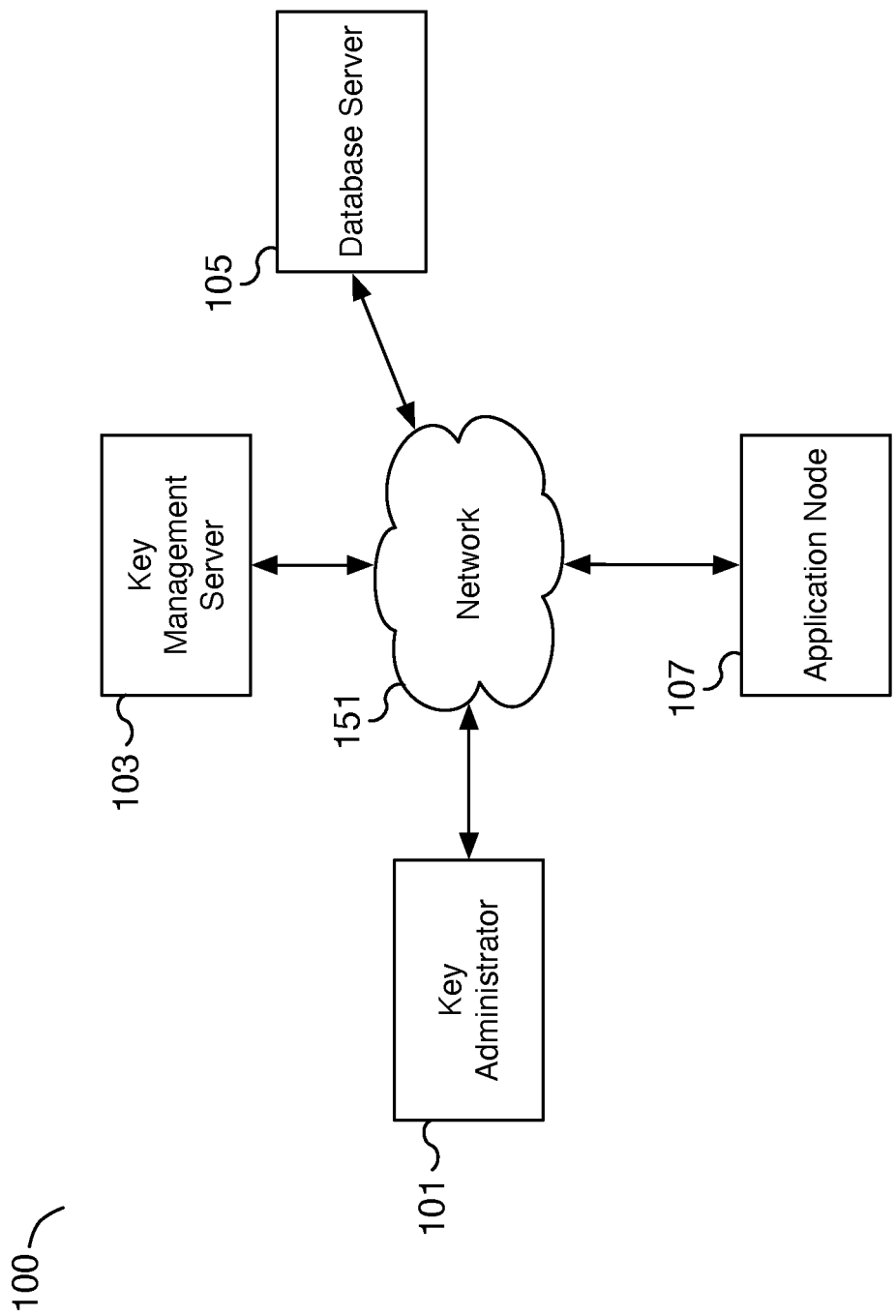
FIG. 1 is a block diagram illustrating an example of a key management platform for the automatic generation and rotation of database encryption keys.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A key management solution for the automatic generation and rotation of database encryption keys is disclosed. In some embodiments, a key management solution automatically extracts encryption keys automatically generated when establishing secure network connections. For example, the extraction of a session encryption key of a secure network connection between a database server and a key management service can be performed by a key management module of a database system. The extracted session encryption key is then utilized for performing a rotation of a database encryption key. For example, a session encryption key extracted from a secure network connection is used to rotate an existing master database key of the database system. In various embodiments, the key rotation is performed as an entirely automated process including automated steps for key generation and key rotation and requires no interactive steps from a human administrator. For example, the key management server can be configured to automatically initiate secure connections with the database system at regular intervals. Each initiated secure connection automatically generates a symmetric session encryption key that is used to rotate an existing database key. In some embodiments, multiple connections are initiated to generate additional database encryption keys. For example, additional secure connections can be initiated to generate additional encryption keys for rotating database tablespace keys.

In some embodiments, an indication that a secure connection has been established with a key management service is received. For example, a database system is notified that a network connection has been established with a remote network client, such as a key management server. The key management server can be hosted independently from the database server and by a third party such as by a different cloud provider than the database server. The established secure connection is associated with an automatically generated session encryption key utilized for encryption of data communication through the secure connection. For example, as part of the secure connection setup, a session encryption key is generated and utilized by both ends of the communication channel for encrypting the network connection session. The generated session encryption key can be a temporary encryption key used for a single network connection session and future secure network connections with the database server will generate their own respective session encryption keys. In some embodiments, each secure network connection is a Hypertext Transfer Protocol Secure (HTTPS) connection and each generated session encryption key is generated during a Transport Layer Security (TLS) handshake when establishing an HTTPS connection.

In some embodiments, in response to the indication that the secure connection has been established with the key management service, a determination is made to perform a rotation of a local encryption key utilized in encrypting locally stored data. For example, a key management module of a database system is notified of the established secure connection and extracts the session encryption key automatically generated by the secure connection. Depending on the number of generated session keys available, one or more local encryption keys are identified for rotation. For example, in some embodiments, a single established secure connection will only result in the automatic rotation of the master database encryption key that may be used to encrypt additional local encryption keys such as database tablespace keys. However, in the event multiple secure connections are established within a rotation window, additional local encryption keys such as individual tablespace keys can be identified for rotation. In some embodiments, the rotation of the local encryption key is performed based at least in part on the automatically generated session encryption key. For example, an extracted session encryption key is used for rotating the identified local encryption key. The extraction of the session encryption key from the secure connection and the key rotation is performed automatically and requires no interactive steps from a human administrator.

In some embodiments, the disclosed techniques are described in the context of automatically generating and rotating database encryption keys used to encrypt locally stored data on a database server. Although described with respect to a database server as an illustrative example, the disclosed techniques also apply and are relevant to the automatic generation and rotation of symmetric encryption keys utilized by any appropriate application server, such as a file server, email server, customer management application server, or another appropriate application server such as one hosting a software-as-a-service application service. Moreover, the rotated encryption keys can be utilized by the appropriate application server for encrypting and decrypting not only locally encrypted data but also remotely encrypted data. For example, the local application server encryption key can be utilized for encrypting and decrypting locally or remotely stored database data, email data, file data, or another type of sensitive or confidential data.

FIG. 1 is a block diagram illustrating an example of a key management platform for the automatic generation and rotation of database encryption keys. In the example shown, key management platform 100 includes components key administrator 101, key management server 103, database server 105, and application node 107 that are communicatively connected via network 151. Network 151 can be a public or private network. In some embodiments, network 151 is a public network such as the Internet. In some embodiments, key management platform 100 is a cloud-based application service platform where key administrator 101 is a customer-hosted key administration client and where key management server 103, database server 105, and application node 107 correspond to various cloud-based services that are made directly or indirectly available to the customer and are hosted by one or more different cloud service providers.

In some embodiments, key administrator 101 is a network client and can be used to initiate the automatic generation and rotation of encryption keys. For example, a human administrator can initiate the automatic generation and rotation of encryption keys for database server 105 by connecting from key administrator 101 to key management server 103 and requesting a key rotation. As another example, key administrator 101 can be configured to automatically connect to key management server 103 to initiate one or more key rotations for database server 105. The configuration can be scheduled to be performed on a set schedule such as a routine key rotation schedule and the connection between key administrator 101 and key management server 103 can be performed automatically without human interaction.

In some embodiments, key management server 103 is a key management server that can be hosted by a third-party independent of key administrator 101, database server 105, and/or application node 107. In some embodiments, key management server 103 can initiate a secure connection with a target application server such as database server 105 to initiate the extraction of the automatically generated session encryption key for key rotation. The initiation of the secure connection to the target application server can be in response to a request from a client such as key administrator 101. In some embodiments, key management server 103 can also independently generate encryption keys outside of the context of a secure connection handshake.

In some embodiments, database server 105 is a database server hosted by a cloud provider. Database server 105 can encrypt data locally, for example, customer data can be stored in an encrypted format using a data store of database server 105. In various embodiments, database tables of the database of database server 105 can be encrypted using one or more tablespace keys and the tablespace keys can be encrypted using one or more master encryption keys. When a secure connection is received from key management server 103, database server 105 extracts the symmetric session key of the secure connection and utilizes it for key rotation. In some embodiments, the session key is extracted by a key management module (not shown) of database server 105.

In the example shown in FIG. 1, application node 107 is an example application server that utilizes database server 105 for providing application services such as a software-as-a-service (SAAS) applications. Application node 107 can be configured to access encrypted customer data that is stored and encrypted (locally or remotely) by database server 105. The data stored locally on database server 105 is protected by encryption keys which can be automatically rotated in coordination with the key administrator 101, key management server 103, and database server 105 as described by the processes herein.

Although single instances of some components have been shown to simplify the diagram, additional instances of any of the components shown in FIG. 1 may exist. For example, a cloud-based service can include multiple database servers such as database server 105 and/or multiple application nodes such as application node 107. In some embodiments, database server 105 and application node 107 may be co-located in the same datacenter and/or reside on the same local network and both key administrator 101 and key management server 103 may be co-located on different networks. For example, key administrator 101 can be hosted by a customer in the customer's own data center, key management server 103 can be hosted by an independent key management cloud service provider that specializes in security services, and database server 105 and application node 107 can both be hosted by another cloud service or software-as-a-service provider. In various embodiments, database server 105 may be replicated and/or distributed across multiple network components. In some embodiments, key administrator 101 is just one example of a potential client for initiating automatic key generation and rotation. In some embodiments, components not shown in FIG. 1 may also exist.

Figure 2:
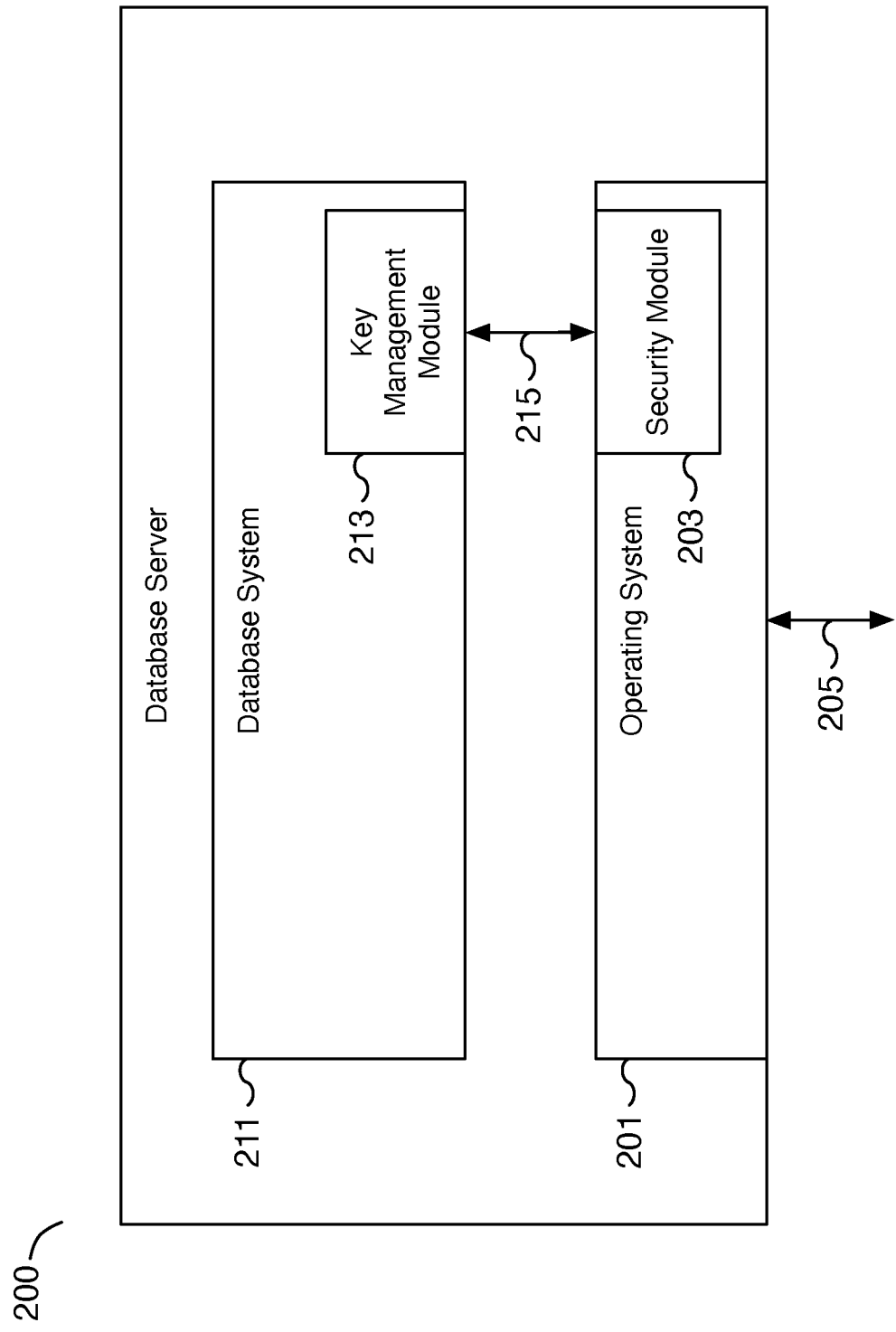
FIG. 2 is a block diagram illustrating an example of a database server configured for the automatic generation and rotation of database encryption keys.

FIG. 2 is a block diagram illustrating an example of a database server configured for the automatic generation and rotation of database encryption keys. In the example shown, database server 200 hosts a database service that includes at least components operating system 201 and database system 211. Operating system 201 is the operating system of database server 200 and includes security module 203. Database system 211 is a collection of one or more application level processes of database server 200 running on operating system 201 that provides the database service to database clients. Database system 211 includes key management module 213 for implementing at least in part the automatic extraction of encryption keys from secure network connections and the automatic key rotation of database encryption keys using the extracted keys. Operating system 201 and database system 211 can communicate via communications channel 215. In some embodiments, communications channel 215 may be implemented using a network connection such as a local network connection, inter-process communication (IPC), or another appropriate communication channel. Utilizing at least components security module 203 of operating system 201 and key management module 213 of database system 211, database system 211 is able to automatically extract and utilize encryption keys from secure network connections for use in rotating database encryption keys. In the example shown, database server 200 communicates with external devices and/or services via network connections 205. For example, network connections 205 can include secure network connections with a key management server such as key management server 103 of FIG. 1 as well as network connections with database service clients such as application node 107 of FIG. 1.

In some embodiments, database server 200 is database server 105 of FIG. 1 and database server 200 can be hosted by a cloud provider for a customer. Network connections 205 can include connections to external devices such as key administrator 101, key management server 103, and/or application node 107 of FIG. 1. In various embodiments, database server 200 includes additional components that are not shown. For example, database server 200 may include an encrypted file system, storage engine, and/or a key store among other database and operating system components. Although shown with a database server as an example in FIG. 2, other application servers and corresponding services can be configured as described with respect to database server 200 to similarly enable the automatic rotation of automatically generated encryption keys.

In some embodiments, operating system 201 is the operating system of database server 200 that is configured to establish secure connections with a key management server. The secure connections may be Hypertext Transfer Protocol Secure (HTTPS) connections and each connection results in generating a session encryption key. For example, a symmetric session encryption key is generated during a Transport Layer Security (TLS) handshake when establishing an HTTPS connection. The generated session encryption key can be used for data communication through the secure connection. In various embodiments, the session encryption key is automatically generated and does not require any intervention from a human administrator.

In some embodiments, security module 203 can provide security functionality including the ability to coordinate with key management module 213 of database system 211 via communications channel 215 to extract session encryption keys from secure network connections. For example, using security module 203, a key extraction request can be communicated and performed between operating system 201 and database system 211. For example, an application such as database system 211 can access the session encryption keys of secure connections established with a key management server and the networking stack (not shown) of operating system 201.

In some embodiments, database system 211 is a database service that runs at least at the application level on top of operating system 201 and leverages existing security functionality including network security functionality of operating system 201. Database system 211 includes key management module 213 along with multiple other components of a database system that are not shown such as a database query processing engine and a database storage engine, among others. Key management module 213 can be implemented as a module to provide automatic key rotation functionality to database system 211 without the need for intervention from a human administrator. For example, key management module 213 can be notified when a secure connection with a key management server is made and receive the automatically generated session encryption key of the secure connection from security module 203 of operating system 201 via communications channel 215. Once a session encryption key is received, key management module 213 can further automatically initiate a database encryption key rotation using the extracted key. In some embodiments, key management module 213 can be configured to rotate a single database key, such as a master encryption key, or multiple database keys, such as a master encryption key along with multiple tablespace keys. Depending on the number of established secure connections within a configured rotation window, key management module 213 can extract and initiate the rotation of multiple encryption keys.

Figure 3:
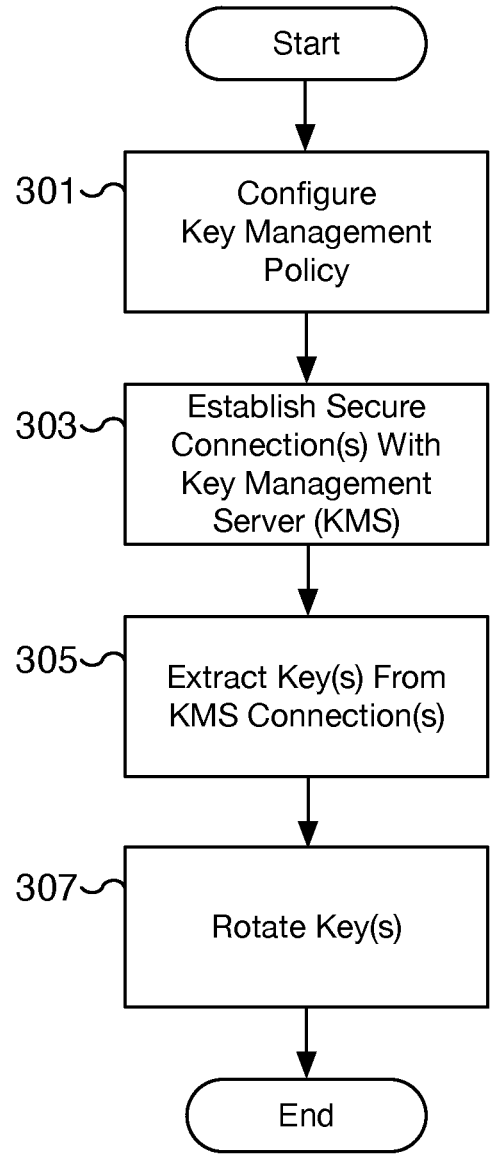
FIG. 3 is a flow chart illustrating an embodiment of a process for automatically rotating encryption keys for a cloud-based application service platform.

FIG. 3 is a flow chart illustrating an embodiment of a process for automatically rotating encryption keys for a cloud-based application service platform. In some embodiments, the cloud-based platform is the cloud-based platform of FIG. 1 and the application service configured for automatic key rotation corresponds to the application service of database server 105 of FIG. 1 and/or database server 200 of FIG. 2. For example, a customer can configure and initiate the automatic generation and rotation of one or more encryption keys of an application service such as a database service by applying the process of FIG. 3. In some embodiments, the process is initiated from a customer key administration client such as key administrator 101 of FIG. 1 with the use of a key management server such as key management server 103 of FIG. 1 to rotate encryption keys utilized by an application server such as database server 105 of FIG. 1.

At 301, a key management policy is configured. For example, a key management policy such as the type of encryption keys, parameters for key generation, frequency of key rotation, target application service for key rotation, corresponding key administrator for initiating key rotation, and/or corresponding key management service for establishing secure connections with the target application service is configured at 301. The configuration can specify the key management server such as key management server 103 of FIG. 1 and provide permissions for the specified key management server to securely connect with the target application server such as database server 105 of FIG. 1 and/or database server 200 of FIG. 2. In some embodiments, a key management policy is configured to rotate one or more encryption keys such as master database encryption keys as well as one or more tablespace encryption keys. The key management policy can be further configured to rotate encryption keys at scheduled intervals such as every three months or in response to event notifications such as an identified potential security breach. In some embodiments, the application service configured for automatic key rotation is a database service, an email service, a file sharing service, a customer management application service, or another appropriate cloud-hosted service that utilizes encryption keys.

At 303, one or more secure connections are established with a key management server. For example, a key management server and an application server configured at 301 establish one or more secure network connections. In various embodiments, the connections are initiated by the key management server to the application server and are used to trigger key rotation at the application server. As part of establishing the secure connection, a secure network handshake is performed and a symmetric session encryption key is generated and utilized for data communications between the key management server and the application server. For each established secure connection, a symmetric session encryption key is generated.

At 305, one or more encryption keys are extracted from the one or more secure connections established with the key management service. For example, for each established secure connection, the automatically generated session encryption key is extracted and received at the database system. In some embodiments, the extracted keys are received by a key management module of the database system. The properties of the extracted keys match the properties configured at 301 for the encryption keys utilized by the application service.

At 307, one or more encryption keys are rotated. For example, using the encryption keys extracted at 305, the encryption keys utilized by the application service configured for rotation at 301 are rotated. In some embodiments, the key rotation performed includes rotating master encryption keys as well as encryption keys encrypted by the master encryption keys such as tablespace keys. For example, encryption keys utilized to encrypt customer data are rotated using session encryption keys extracted at 305. The new encryption keys are themselves encrypted by a new master key using a different session encryption key extracted at 305 from a different secure connection.

Figure 4:
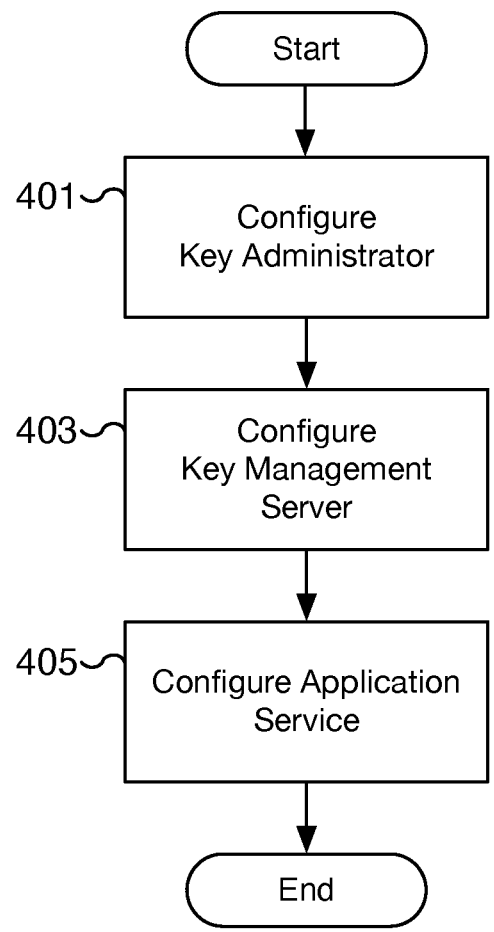
FIG. 4 is a flow chart illustrating an embodiment of a process for configuring the key management policy of a cloud-based application service platform.

FIG. 4 is a flow chart illustrating an embodiment of a process for configuring the key management policy of a cloud-based application service platform. For example, the key management policy of a cloud-based application service, such as a database service, is configured from a customer key administration client using a key management server. In some embodiments, the customer key administration client is key administrator 101 of FIG. 1, the key management server is key management server 103 of FIG. 1, and the application service is the application service of database server 105 of FIG. 1 and/or database server 200 of FIG. 2. In some embodiments, the configuration process of FIG. 4 is performed at 301 of FIG. 3.

At 401, a key administrator is configured. For example, a customer key administration client is configured to connect to the correct key management server. The key administrator may be configured with the correct access privileges for initiating key rotation for an application server, such as database server 105 of FIG. 1 and/or database server 200, and the corresponding application service, such as the database service of database system 211 of FIG. 2. In some embodiments, the key administrator is configured to invoke key rotations using an automated key rotation schedule such as one based on time or number of requests processed between key rotations. In some embodiments, the key administrator is configured to initiate a key rotation in response to a notification such as a security notification that an encryption key or other security measure has been compromised.

At 403, a key management server is configured. For example, a key management server is configured with the appropriate key administrator and application service. In response to a request from the appropriate key administrator, the key management server will initiate a secure network connection with the target application server. In various embodiments, the key management server is configured with the appropriate network configuration and connection configuration properties in order to automatically generate the correct type of session encryption keys compatible with the encryption keys required by the target application service.

At 405, an application service is configured. For example, an application server hosting an application service, such as a database service, is configured to accept incoming secure connection requests from the key management server configured at 403. The established secure connection and the application service can be configured to utilize encryption keys with the same format and requirements. Once a session encryption key is generated initially for data communication over a secure network connection, the session key can be extracted and passed to the application service. For example, the application service is configured to receive extracted session keys from the secure connections established with the key management server. In some embodiments, the application service is configured by at least in part configuring a key management module of the application service such as key management module 213 of database system 211 of FIG. 2. For example, when a session key is received by a key management module of an application service, the key management module can initiate a key rotation using the received session key as an application service encryption key.

In some embodiments, a rotation window is configured at the various components for initiating the rotation of multiple keys. For example, in the event multiple connections are established within the configured rotation window, each extracted session key can be utilized for rotating a different application service encryption key. Once the rotation window has closed, the application server can determine how many extracted session keys have been received and match the received session keys to determine which application service keys should be rotated. For example, in the event only a single secure connection is established during a rotation window, the single extracted encryption key can be utilized to rotate the master encryption key. As another example, in the event the number of secure connections established during a rotation window matches at least the number of tablespace keys, each tablespace key can be rotated using a different extracted session key.

Figure 5:
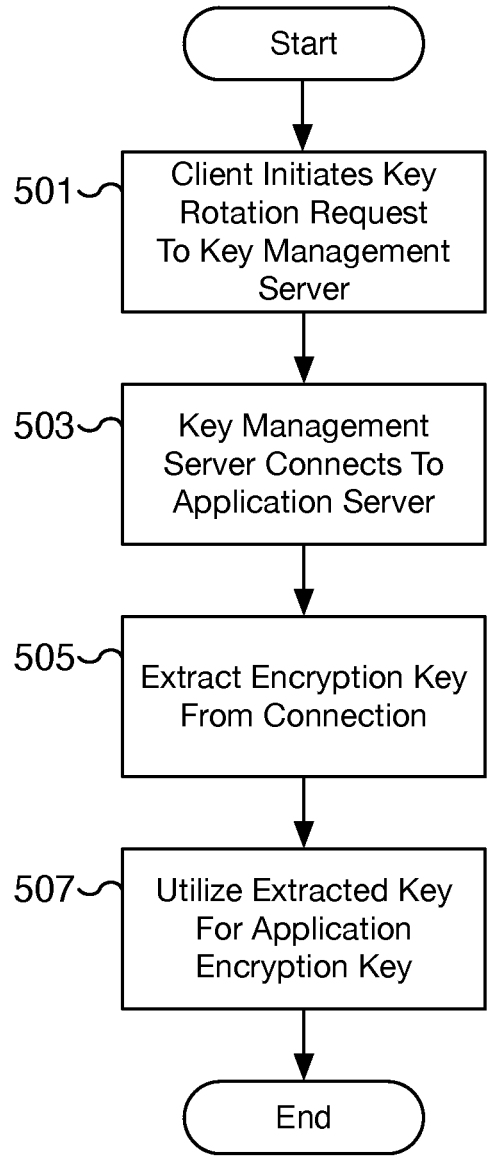
FIG. 5 is a flow chart illustrating an embodiment of a process for automatically generating and rotating encryption keys for a cloud-based application service platform.

FIG. 5 is a flow chart illustrating an embodiment of a process for automatically generating and rotating encryption keys for a cloud-based application service platform. For example, a customer key administration client is used to initiate one or more key rotations at an application service by using a key management server as an intermediary. The keys utilized in the rotations are automatically generated during the setup of secure network connections between the key management server and the application service. In some embodiments, the customer key administration client is key administrator 101 of FIG. 1, the key management server is key management server 103 of FIG. 1, and the application service is the application service of database server 105 of FIG. 1 and/or database server 200 of FIG. 2. In some embodiments, the various components utilized for the key rotation are configured at 301 of FIG. 3 and/or using the process of FIG. 4. In some embodiments, the steps 501 and/or 503 are performed at 303 of FIG. 3, step 505 is performed at 305 of FIG. 3, and step 507 is performed at 307 of FIG. 3.

At 501, a client initiates a key rotation request to a key management server. For example, a customer utilizes a key administration client such as key administrator 101 of FIG. 1 to send a key rotation request to a key management server. The particular key rotation request corresponds to a key rotation request for a specific application service and the specified application service along with other key rotation parameters may be embedded in the particular request. In some embodiments, the client and key management server require the appropriate access permissions for initiating the key rotation. In some embodiments, the client request is an automated request. For example, the requests initiated can be automated to be sent at regular intervals to perform key rotations on a regular schedule. In some embodiments, the request is an automated request sent in response to a notification such as a security alert.

At 503, the key management server connects to the application server. For example, the key management server initiates and establishes a secure network connection with the target application server. In some embodiments, the established secure network connection is a Hypertext Transfer Protocol Secure (HTTPS) connection. As part of the process of generating the secure connection, a Transport Layer Security (TLS) handshake is performed and a symmetric session encryption key is automatically generated for data communications between the key management server and the application server. The generated session encryption key is utilized for data communications over the network connection but also conforms to the encryption key requirements of the application service.

At 505, an encryption key is extracted from the connection. For example, the session encryption key is extracted from the secure connection established between the key management server and the application server. In some embodiments, the key is extracted at the operating system level by a secure networking module of the operating system such as security module 203 of operating system 201 of FIG. 2. In some embodiments, the key is extracted at least in part at the application layer by a key management module of the application service such as key management module 213 of database system 211 of FIG. 2. For example, the operating system of the application server makes the session key available to a key management plugin module of the application service running in the application layer. In various embodiments, the extraction of the encryption key is automated and the application service of the application server receives the extracted session key without any required human interaction.

At 507, the extracted key is utilized for an application service encryption key. For example, the session encryption key extracted at 505 is utilized as an encryption key for the application service. In some embodiments, the session key is used to rotate a master database key, a tablespace key, or another appropriate application encryption key. Since the extracted session encryption key conforms to the key requirements of the application service, the session key can be used to replace an application encryption key by performing a key rotation. In various embodiments, the application encryption key is used to encrypt locally or remotely stored customer data utilized by the application service.

Figure 6:
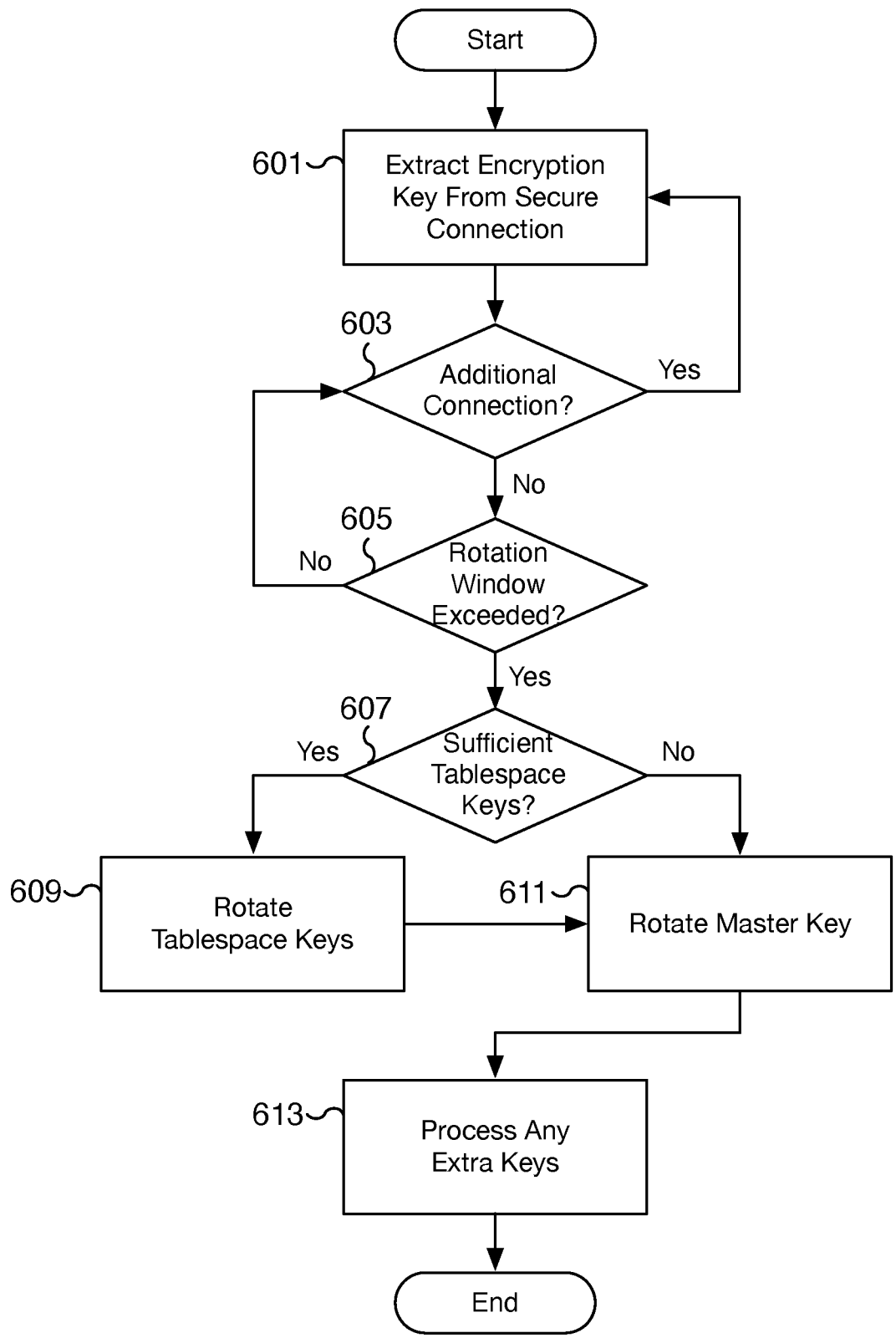
FIG. 6 is a flow chart illustrating an embodiment of a process for automatically generating and rotating database encryption keys for a cloud-based database service.

FIG. 6 is a flow chart illustrating an embodiment of a process for automatically generating and rotating database encryption keys for a cloud-based database service. For example, using the process of FIG. 6, one or more database encryption keys for encrypting customer data can be automatically rotated. The automatic key rotation includes the automatic generation of a new encryption key and does not require any human administrator intervention. In the example shown, the key rotation can rotate master keys as well as tablespace keys based on the number of received session encryption keys. In some embodiments, the process of FIG. 6 is performed by an application server such as database server 105 of FIG. 1 and/or database server 200 of FIG. 2. In some embodiments, the process of FIG. 6 is performed at 305 and/or 307 of FIG. 3. In some embodiments, the process of FIG. 6 is performed at 505 and/or 507 of FIG. 5.

At 601, an encryption key is extracted from a secure network connection. For example, a session encryption key is extracted from a secure network connection established between a database server and a key management server.

At 603, a determination is made whether an additional secure connection is established. In the event an additional secure connection is established, processing loops back to step 601 where the encryption key from the additional connection is extracted. In the event no additional secure connection is established, processing proceeds to step 605.

At 605, a determination is made whether the rotation window has been exceeded. In the event the rotation window has been exceeded, processing proceeds to step 607. In the event the rotation window has not been exceeded, processing loops back to step 603 to determine whether any additional secure network connections were established within the rotation window.

At 607, a determination is made whether there is a sufficient number of extracted session encryption keys for the tablespace keys. In the event there is a sufficient number of extracted session encryption keys, processing proceeds to step 609 where the tablespace keys are rotated. For example, the tablespace keys can be rotated if the number of extracted session keys matches or exceeds the number of required tablespace keys. Additional keys that exceed the number of tablespace keys can be utilized to rotate the master encryption key. In the event there is not a sufficient number of extracted session encryption keys, processing proceeds to step 611 where only the master encryption key is rotated.

At 609, rotation of database tablespace encryption keys is performed. For example, each database tablespace encryption key is replaced with a new encryption key that corresponds to a different extracted session encryption key. In some embodiments, the number of received session keys is less than the total number of tablespace keys and only a subset of tablespace keys is rotated. In various embodiments, a different subset of tablespace keys may be rotated for each key rotation interval. For example, half the tablespace keys may be rotated using session keys extracted from a first rotation window and the remaining half of the tablespace keys may be rotated using session keys extracted from a second rotation window. In some embodiments, the new tablespace keys may be encrypted with the existing master key in the event the master key is not rotated at 611.

At 611, a rotation of the master encryption key is performed. For example, if there are a sufficient number of remaining session keys in the event tablespace keys are rotated, the master encryption keys are rotated. In some embodiments, a database system only utilizes a single master key and only a single master key rotation is performed. In some embodiments, the master key rotation requires encrypting newly rotated tablespace keys.

At 613, any extra extracted session encryption keys are processed. For example, additional session keys may be extracted from additional secure connections but may not be needed for the configured key rotation policy. For example, in some embodiments, only a single encryption key is needed to rotate a master encryption key. As another example, there may be additional remaining keys even after all tablespace keys and master keys have been rotated. Additional keys can be processed and stored at the application service and utilized when needed and/or appropriate. In some embodiments, any extra keys are discarded.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    establishing a secure connection from a first server to a second server with a key management service, wherein the secure connection is associated with an automatically generated session encryption key utilized for encryption of data communication through the secure connection between the first server and the second server;
    determining to perform a rotation of a local encryption key utilized in encrypting locally stored data; and
    performing the rotation of the local encryption key based at least in part on the automatically generated session encryption key including by obtaining the automatically generated session encryption key from an operating system of the first server and determining a replacement key for the local encryption key based on the automatically generated session encryption key previously used to encrypt network communication between the first server and the second server.

2. The method of claim 1, wherein the local encryption key is a database master encryption key.

3. The method of claim 1, wherein the local encryption key is a database tablespace encryption key.

4. The method of claim 1, wherein the secure connection is a Hypertext Transfer Protocol Secure (HTTPS) connection.

5. The method of claim 1, wherein the automatically generated session encryption key is generated in response to performing a Transport Layer Security (TLS) handshake.

6. The method of claim 1, wherein the automatically generated session encryption key is a symmetric encryption key.

7. The method of claim 1, wherein the key management service is hosted by an independent third party different from the first server.

8. The method of claim 1, wherein the local encryption key is utilized for encrypting database data, email data, or file data.

9. The method of claim 1, wherein the secure connection is established in response to an automated key rotation schedule.

10. The method of claim 1, wherein the secure connection is established in response to a security notification.

11. A system, comprising:
    one or more processors; and
    a memory coupled to the one or more processors, wherein the memory is configured to provide the one or more processors with instructions which when executed cause the one or more processors to:
        establishing a secure connection from a first server to a second server with a key management service, wherein the secure connection is associated with an automatically generated session encryption key utilized for encryption of data communication through the secure connection between the first server and the second server;
        determine to perform a rotation of a local encryption key utilized in encrypting locally stored data; and
        perform the rotation of the local encryption key based at least in part on the automatically generated session encryption key including by being configured to obtain the automatically generated session encryption key from an operating system of the first server and determine a replacement key for the local encryption key based on the automatically generated session encryption key previously used to encrypt network communication between the first server and the second server.

12. The system of claim 11, wherein the local encryption key is a database master encryption key or a database tablespace encryption key.

13. The system of claim 11, wherein the secure connection is a Hypertext Transfer Protocol Secure (HTTPS) connection.

14. The system of claim 11, wherein the automatically generated session encryption key is generated in response to performing a Transport Layer Security (TLS) handshake.

15. The system of claim 11, wherein the automatically generated session encryption key is a symmetric encryption key.

16. The system of claim 11, wherein the key management service is hosted by an independent third party different from the first server.

17. The system of claim 11, wherein the local encryption key is utilized for encrypting database data, email data, or file data.

18. The system of claim 11, wherein the secure connection is established in response to an automated key rotation schedule.

19. The system of claim 11, wherein the secure connection is established in response to a security notification.

20. A computer program product, the computer program product being embodied in a non-transitory computer readable storage medium and comprising computer instructions for:
    establishing a secure connection from a first server to a second server with a key management service, wherein the secure connection is associated with an automatically generated session encryption key utilized for encryption of data communication through the secure connection between the first server and the second server;
    determining to perform a rotation of a local encryption key utilized in encrypting locally stored data; and
    performing the rotation of the local encryption key based at least in part on the automatically generated session encryption key including by obtaining the automatically generated session encryption key from an operating system of the first server and determining a replacement key for the local encryption key based on the automatically generated session encryption key previously used to encrypt network communication between the first server and the second server.

* * * * *